UNITED STATES PATENT OFFICE.

WILHELM HERZBERG, OF BERLIN, OSWALD SCHARFENBERG, OF SCHÖNEBERG, AND MAX RONUS, OF BERLIN, GERMANY, ASSIGNORS TO ACTIEN GESELLSCHAFT FÜR ANILIN FABRIKATION, OF BERLIN, GERMANY.

SULFUR DYE AND PROCESS OF MAKING SAME.

No. 864,644.  Specification of Letters Patent.  Patented Aug. 27, 1907.

Application filed June 3, 1907. Serial No. 377,069.

*To all whom it may concern:*

Be it known that we, WILHELM HERZBERG, OSWALD SCHARFENBERG, and MAX RONUS, the former two subjects of the Emperor of Germany, the latter of the Swiss Republic, residing at Berlin, Hagelsbergerstrasse 10°, respectively, Schöneberg, near Berlin, Wartburgstrasse 9, and Berlin, Schöneberger Ufer 36ª, have invented certain new and useful Improvements in New Sulfurized Dyestuffs and Processes of Making Same, of which the following is a specification.

Our present invention relates to the manufacture of new sulfurized dyestuffs by acting with an alkali-poly-sulfid upon an arylsulfonic derivative having the general formula:

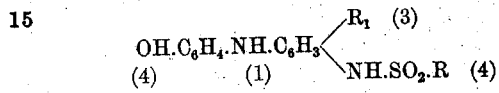

in which formula R means an aryl-group, such as for instance $C_6H_5$ or $CH_3.C_6H_4$, and $R_1$ signifies another radical, such as for instance chlorin or a hydrogen atom. The reaction may be performed in an aqueous solution, more or less concentrated, as well as with the aid of another solvent, such as for instance alcohol. We have furthermore found, that the new sulfurized products thus formed still contain the residue of the respective arylsulfonic acid and that, when this residue is eliminated in a suitable manner, very valuable dyestuffs are obtained which dye cotton directly, from a bath containing an alkali-sulfid, clear and deep blue shades which show a very good fastness to washing and light and are fast to acids; whereas the above-named intermediate compounds dye also cotton without a mordant blue tints, but which tints are not fast to acids.

The reaction, which underlies our present invention, therefore proceeds in two steps; as to the second step, namely the elimination of the residue of the respective arylsulfonic acid, it may be effected in any suitable manner, for instance by the action of concentrated sulfuric acid.

The following examples serve to illustrate our invention, the parts being by weight.

*Example 1): Production of the intermediate compound from the para-toluenesulfonic derivative of para-amino-para¹-oxydiphenylamin:*

$$OH.C_6H_4.NH.C_6H_4.NH.SO_2.C_6H_4.CH_3.$$
$$(4) \quad (1) \quad (4) \ (1) \quad (4)$$

180 parts of this body are introduced into a solution of sodiumpolysulfid, which is prepared by melting together 620 parts of crystallized sodium-sulfid and 310 parts of sulfur and adding to the melt 275 parts of water. This mixture is then heated to the boil, using a reflux apparatus, during 48 hours, whereafter a yellow-brown solution is obtained, from which solution the sulfurized product is separated in the manner as usual for sulfurized dyestuffs. For instance a current of air is introduced into the reaction mass after diluting it with water, whereby the dyestuff is precipitated and is isolated by filtering and drying. Thus is obtained a powder of a copper-like luster, which easily dissolves in water with a pure blue coloration, from which solution the new product is separated in the shape of red-brown flakes by the addition of an acid; these red-brown flakes on their part again easily dissolve in boiling diluted soda-lye. This new sulfurized body dyes cotton blue tints, which are not fast to acids.

*Example 2): Production of the dyestuff from the intermediate compound by eliminating the residue:*

10 parts of the intermediate compound are dissolved while agitating well in 30 parts of concentrated sulfuric acid; the mass is then poured on ice and the dyestuff isolated by filtering, washing with water, which to the end of the washing operation is added with some sodium-carbonate in order to remove the rest of the sulfuric acid used, and drying. Thus is obtained a dark powder of a bronze luster, which is insoluble in water and in a boiling diluted soda-lye as well as in the usual organic solvents. By concentrated sulfuric acid the dyestuff is dissolved with a reddish-blue coloration, from which solution by the addition of ice the product is again precipitated. This new product dyes cotton without a mordant from a bath containing an alkali-sulfid, clear and deep blue shades which are fast to acids and are of a very good fastness to washing and to light. The fact that the tints obtained with this dyestuff are directly, *i. e.* without a subsequent treatment with copper salts, fast to washing is very characteristic for the new dyestuff.

Of course, as stated in the preamble of the specification, instead of the para-toluenesulfonic derivative of para-amino-para¹-oxydiphenylamin used in the foregoing example for instance the corresponding benzenesulfonic derivative may be used.

Among other derivatives of the above-given general formula, which are to be treated with an alkali-polysulfid according to our present invention, we name for instance the para-toluene-sulfo-para-amido-meta-chloro-para¹-oxydiphenylamin:

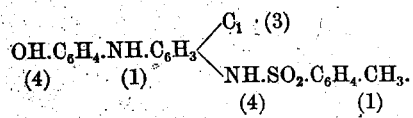

This arylsulfonic derivative, when converted into a sulfurized dyestuff according to our present invention, yields on cotton, from a bath containing an alkali-sulfid, clear and deep red-blue tints which are directly fast to washing and light, and to acids. This dyestuff is a dark powder of a brown luster, which is insoluble in water and in boiling diluted soda-lye; also insoluble in the usual organic solvents. In concentrated sulfuric acid it dissolves to a violet colored solution, from which solution the dyestuff is again precipitated in blue-black colored flakes.

It is obvious to those skilled in the art that our present invention is not limited to the foregoing examples or to the details given therein. First it may be stated, that not only the proportion of the alkali-polysulfid in respect to the proportion of the parent material to be treated therewith, may be varied within wide limits without essentially changing the result, but also the proportions of the alkalimonosulfid in respect to the proportions of the sulfur, from which proportions the character of the alkalipolysulfid to be used depends as a disulfid, or tri-, tetra- or penta- sulfid, etc., can be changed to a great extent without departing from the scope of our present invention. Furthermore, as to the medium or media, within which the reaction as according to our present invention may be carried out, for the aqueous solution employed in the foregoing example other medium or media may be employed, such as for instance an alcoholic-aqueous solution or an alcoholic solution or the like. Of course the special conditions of the reaction must then be selected so as to suit the nature of the medium employed as well as of the parent-material and of the reaction product in order to obtain the best results. Finally it is convenient to say that the elimination of the residue of the respective arylsulfonic acid, for instance of the group: $SO_2.C_6H_4.CH_3$, may be effected in any suitable way other than that given in the above example.

Now what we claim is:—

1. The hereinbefore-described manufacture of new sulfurized dyestuffs, dyeing cotton without a mordant blue tints, by acting with an alkali-polysulfid upon an arylsulfonic derivative of an amidooxy-compound of the general formula as defined in the foregoing specification and converting the sulfurized intermediate compounds into the new dyestuffs by eliminating the residue of the respective arylsulfonic acid.

2. As new articles of manufacture the hereinbefore-described new sulfurized dyestuffs, dyeing cotton without a mordant clear blue tints which are directly, namely without a subsequent treatment with copper salts, fast to washing, which tints are also fast to light and to acids, which dyestuffs may be obtained by acting with an alkali-polysulfid upon an arylsulfonic derivative of an amidooxy-compound of the general formula as defined in the foregoing specification and converting the sulfurized intermediate compound into the dyestuffs by eliminating the residue of the respective arylsulfonic acid, these dyestuffs being in the dry state dark powders of a bronze luster, which are insoluble in water and in boiling diluted soda-lye as well as in the usual organic solvents, and which dyestuffs dissolve in concentrated sulfuric acid to from blue to violet colored solutions, from which solutions the dyestuffs are again precipitated by the addition of ice.

3. As a new article of manufacture the hereinbefore-described blue sulfurized dyestuff, which may be obtained by acting with sodium-pentasulfid upon para-toluene-sulfo-para-amido-para-oxydiphenylamin in an aqueous solution, and eliminating from the sulfurized intermediate compound the residue: $SO_2.C_6H_4.CH_3$ by the action of concentrated sulfuric acid, which dyestuff dyes cotton without a mordant a clear deep blue tint, which tint is directly, namely without a subsequent treatment with a copper salt, fast to washing, and which tint is also fast to light and to acids, this dyestuff being in the dry state a dark powder of a bronze luster, which is insoluble in water and in a boiling diluted soda-lye as well as in the usual organic solvents, and which dyestuff dissolves in concentrated sulfuric acid to a reddish blue colored solution, from which solution the dyestuff is again precipitated by the addition of ice.

In testimony whereof we have hereunto set our hand in presence of two subscribing witnesses.

WILHELM HERZBERG.
OSWALD SCHARFENBERG.
MAX RONUS.

Witnesses:
WOLDEMAR HAUPT,
HENRY HASPER.